3,407,187
ANTISTATIC AGENTS
Christos Savides, Piscataway Township, Middlesex County, N.J., and John Edward Milks, Stamford, Conn., assignors of one-half each to American Cyanamid Company, Stamford, Conn., a corporation of Maine, and Arizona Chemical Company, New York, N.Y., a corporation of Delaware
No Drawing. Filed Sept. 1, 1965, Ser. No. 484,455
8 Claims. (Cl. 260—89.5)

This invention relates to a method for imparting antistatic properties to polymeric compositions and, more particularly, to a method for minimizing the accumulation of static electricity in polymers such as polyolefins, vinyl chloride polymers, styrene polymers, acrylic polymers, etc. The method involves incorporating in the polymer a compound represented by the following Formula I:

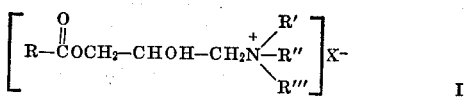

wherein R is an aliphatic or a cycloaliphatic radical of eight to nineteen carbon atoms (straight or branched); R', R" and R''' are lower alkyl radicals of 1–3 carbons; and X is an anion. It relates further to the polymeric compositions resulting from this method.

Polymeric plastic compositions typified by polymers of monoolefins (e.g., homopolymers and copolymers of ethylene, propylene and butylene) tend to accumulate surface electric charges during fabrication, and, subsequently, during the life of the material. This is highly objectionable for a number of reasons. Charged bodies attract dust, and, depending upon conditions, may also cause other troublesome effects such as shock to the person contacting the charged material, radio interference, etc.

Various means have been proposed to overcome or minimize the accumulation of surface electric charges including surface application of various types of antistatic materials, e.g., quaternary ammonium salts. However, surface treatment is often of only temporary assistance. Application of a coating composition containing an antistatic agent, has also been proposed, but coating processes are costly and the effect is not permanent.

It has also been proposed to incorporate the antistatic agent into the plastic composition during either compounding, molding or fabrication steps. For practical purposes, an antistatic agent which is to be used by incorporation directly into the plastic, must fulfill certain requirements. To begin with, the agent must have sufficient antistatic activity when applied at feasible concentrations. Thus, the agent should be effective at low concentrations for reasons of economy and, in addition, to avoid impairing the properties of the polymeric substrate. The material must be compatible with the plastic composition and must be of such a nature that it can be easily incorporated during the conventional compounding and milling steps. The antistatic properties of the agent should be substantially permanent and should outlast exposure to high temperatures. Heat stability is especially important for use in polypropylene which must be heated to high temperatures to enable proper compounding, milling and molding thereof.

Materials have previously met certain of these requirements to varying degrees. However, there is still a definite need for a practical antistatic agent which is effective at low concentrations and has good heat stability so that its effect is not destroyed during the processing steps.

The present invention is based on the discovery that the quaternary alkyl ammonium esters defined by Formula I meet the stated requirements for useful antistatic agents. Thus, members of this class are highly active in polyolefins at low concentrations. The antistatic agents of this invention are effective even at concentrations as low as about 0.1% based on the weight of the polymer. Higher concentrations up to about 5% are also useful for specialized requirements. For normal applications, they are used in concentrations of 0.3% to 2.0%. The matter of choosing a concentration to fit a particular need will be easily dealt with by the ordinarily skilled artisan.

A surprising feature of the antistatic agents of this invention is their uniquely high thermal stability. As stated above, heat stability is an important requirement for useful plastic antistatics. The compounds of this inventoin are definitely superior in this respect to previous antistatic compounds. This property can be demonstrated in different ways, such as by noting the progressive decomposition of the compound itself as evidenced by loss in weight when subjected to increasingly high temperatures; or by noting the discoloration or decomposition of a plastic composition containing the antistatic compound. In some instances, when the composition containing the antistatic compound is subjected to progressively increasing temperatures, the antistatic agent accelerates the decomposition of the plastic. With the agents of this invention, this effect is greatly minimized.

Several methods are available for evaluation of the compounds of the invention as antistatics. Molded or extruded formulations of the polyolefins containing a known amount of the antistatic agents are prepared and these are then evaluated for heat stability, surface resistivity, and presence and strength of surface static charge. A preliminary test of the antistatic properties of the compound consists of wetting a strip of acrylic paper with a solution of the compound in isopropanol and measuring the surface resistivity of the dried strip after it has been subjected to a high potential.

The antistatic agents defined by Formula I can be prepared by reacting a glycidyl ester (II) with a secondary amine (III) to give a hydroxy amino ester (IV) which is then quaternized in the usual manner.

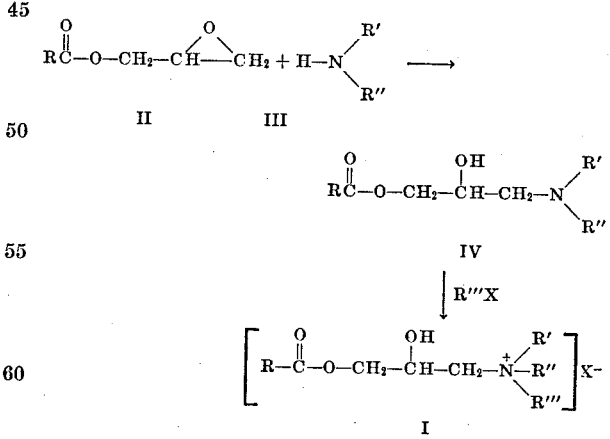

The symbols R, R', R", R''' and X are as defined above. The reaction to produce IV can be conducted with or without a solvent, at elevated temperature (i.e., temperatures in the range of about 50° to 100° C.). No catalyst is necessary, but it is preferable to have an excess of amine in the reaction mixture. Thus, more than one, i.e., about three moles of amine, for each mole of glycidyl ester, should be employed.

Compound IV can be isolated from the reaction product by distillation procedures, and then quaternized by treatment with conventional alkylating agents to give the desired antistatic agent.

Advantageously, starting materials for the foregoing reactions are generally available on a commercial basis. They may be either synthetic materials or derived from natural sources. In general, the natural materials are mixtures of acids of varying chain length, although single component natural materials are also useful.

Among the useful glycidyl esters are glycidyl palmitate, glycidyl stearate, glycidyl laurate, glycidyl oleate, glycidyl linoleate, glycidyl linoleneate and glycidyl esters of such mixed acids as coconut oil fatty acids (predominately lauric acid having other $C_8$–$C_{18}$ acidic components), tall oil fatty acids (mainly $C_{18}$ mixed saturated, unsaturated, polyunsaturated acids such as oleic, linoleic and linolenic acids), $C_9$–$C_{11}$ neo-carboxylic acids and rosin acids (mainly abietic acid and partially hydrogenated derivatives).

Useful amines for preparing the hydroxyamino esters of Formula IV are secondary amines having any combination of methyl, ethyl and propyl radicals, for example, dimethylamine, diethylamine, dipropylamine, ethylmethylamine, etc.

Useful quaternizing agents are common alkylating agents such as lower dialkylsulfates (e.g., dimethyl sulfate, diethyl sulfate, etc.), methyl iodide, ethyl iodide, etc.

The quaternary compounds of Formula I as well as the hydroxyamino esters of Formula IV undergo reversible transesterification reactions so that upon standing, instead of only a single compound being present in any specific composition as is indicated by the respective formulae, each product consists of an equilibrium mixture of four isomers, with the structures of Formulae I and IV pre-

EXAMPLE 1

Evaluation of antistatic agents in polyvinyl chloride (1) SAMPLE PREPARATION

The additives were incorporated into polyvinyl chloride by milling on a two-roll laboratory mill at 175° C. at 1.5% concentration for five minutes. The milled sheet obtained was compression-molded at 170–175° C. and under 24 tons pressure into plaques 2 x 2½ x 0.050 inches.

(2) TEST METHODS

A. *Resistivity measurements.*—Surface resistivity measurements were made according to a modified ASTM D257–58 using a Tera-Ohmmeter (Rhode and Schwartz Co.) at 900 volts.

Surface resistivity, expressed as megohms (instrument reading) is defined as the ratio of the direct voltage (900 volts) to the current on the surface of the polymer sample when the electrodes of the Tera-Ohmmeter are placed on opposite sides of the sample.

All samples were conditioned for at least 24 hours at 70° F. and 50% relative humidity and the measurements were made under the above conditions; low resistivity values indicate antistatic properties. It is suggested that a minimum of $10^4$ megohms is required for antistatic polyvinyl chloride compositions (British Plastics, March 1956).

B. *Thermal stability measurements.*—The compressed-molded samples of the polymer containing the various antistatic agents were tested for thermal stability by oven-aging in a forced draft oven (Blue M Corporation) at 175° C. The samples were removed at five minute intervals and examined visually for discoloration.

The results of the test are shown below in the table.

TABLE I.—PVC WITH 1.5% ADDITIVE

| $R-\overset{O}{\underset{\|}{C}}-CH_2-CHOH-CH_2-N^{\oplus}(CH_3)_3CH_3SO_4^{\ominus}$ <br> R=Acid Source | Surface Resistivity (megohms) | Yellow Index | Discoloration Oven-Aging at 175° C. (Color, Minutes) | | | | |
|---|---|---|---|---|---|---|---|
| Stearic (pure) | 50×10² | 4 | None, 0 | Trace yellow, 6 | V. lt. yellow, 11 | Yellow, 14 | Orange, 17. |
| Coconut | 14×10 | 5 | Trace yellow, 0 | Lt. yellow, 9 | Yellow, 12 | Lt. orange, 15 | Dk. red, 20. |
| Synthetic mixed acids $C_9$–$C_{11}$ | 15×10² |  | V. lt. yellow, 0 | Lt. yellow, 6 | Yellow, 11 | 14 | Black, 17. |
| Tall Oil acids | 43×10 |  | do | do | do | 14 | Dk. red, 17. |
| Control | 50×10⁷ | 1 | None, 0 | Trace yellow, 9 |  |  | Lt. yellow, 20. | dominating. The various intramolecular rearrangements occur along the following lines:

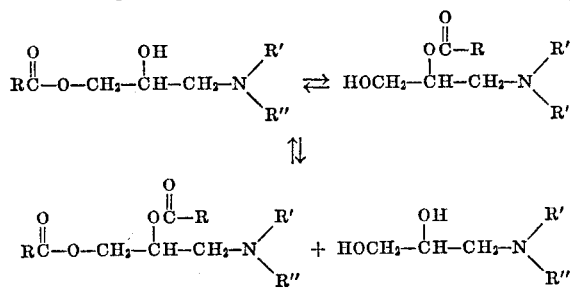

The present invention contemplates use of quaternary salts of Formula I as well as the equilibrium mixtures which result form the intramolecular shifting of the acyl groups.

The plastic materials for which the antistatic agents of this invention are most valuable are those which by their nature are processed at high temperatures. Typical of these are the polymers of monoolefins of 2–4 carbons such as ethylene and propylene, polyvinyl chloride, polystyrene and rubbery copolymers thereof, acrylics such as polymethyl methacrylate, etc.

The present invention is illustrated by the following examples in which parts and percentages are on a weight basis.

EXAMPLE 2

Evaluation in polyethylene

The compounds were evaluated at a concentration of 2% in polyethylene using a procedure similar to that described under Example 1 for polyvinyl chloride.

In addition, results are shown of a preliminary screening test using a procedure described as follows:

Preliminary screening test

In order to determine the inherent antistatic activity, a 0.5% solution of the compound in isopropanol was prepared and a strip of acrylic paper dipped into the solution. The paper was dried and conditioned for 24 hours at 50% relative humity. At the end of this time, the antistatic activity was measured using a Tera-Ohmmeter. The samples were subjected to a potential of 900 volts for one minute and the surface resistivity measured. Samples having avlues less than $10\times10^4$ megohms were considered as being antistatic. For convenience, these preliminary screening results are included in the table even though the determinations are not made in polyethylene.

The results are shown in the table which follows:

TABLE II.—HIGH DENSITY POLYETHYLENE AT 2.0%

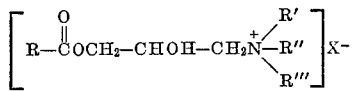
R=Acid Source

| | Acrylic Paper Test (Megohms) | Surface Resistivity (Megohms) |
|---|---|---|
| Control (none) | 15×10⁷ | 50×10⁷ |
| Stearic Acid | 51×10 | 50×10² |
| Mixed Tall Oil Acids | 30×10 | 70×10³ |
| Synthetic C₉ to C₁₁ | 20×10 | 35×10² |
| Rosin Acids | 14×10³ | 30×10⁴ |

We claim:
1. A polymeric composition having improved antistatic properties comprising (a) as the polymeric substrate a polyolefin, a vinyl chloride polymer, a styrene polymer or a polyacrylate, and (b) from 0.1 to 5% based on the weight of (a) of a quaternary compound of the formula:

$$\left[ \begin{array}{c} \text{O} \quad\quad\quad R' \\ \| \quad\quad\quad\quad +/ \\ R-COCH_2-CHOH-CH_2N-R'' \\ \quad\quad\quad\quad\quad\quad\quad \backslash R''' \end{array} \right] X^-$$

wherein R is an aliphatic or a cycloaliphatic radical of eight to nineteen carbon atoms; R', R" and R''' are lower alkyl radicals of 1–3 carbons; and X is an anion.

2. The composition of claim 1 wherein the polymer is polyvinyl chloride.

3. The composition of claim 1 wherein the polymer is polyethylene.

4. The composition of claim 1 wherein the polymer is polypropylene.

5. The composition of claim 1 wherein the polymer is polymethyl methacrylate.

6. The composition of claim 1 wherein R is the acid radical of coconut acids, each of R', R" and R''' is methyl and X is methosulfate.

7. The composition of claim 1 wherein R is stearyl, each of R', R" and R''' is methyl and X is methosulfate.

8. The composition of claim 1 wherein R is derived from $C_9$–$C_{11}$ mixed neo-carboxylic acids, each of R', R" and R''' is methyl and X is methosulfate.

No references cited.

JOSEPH L. SCHOFER, *Primary Examiner.*

HARRY WONG, JR., *Assistant Examiner.*